July 25, 1950          G. E. DATH          2,516,300
FRICTION SHOCK ABSORBING MECHANISM FOR RAILWAY CARS
Filed Oct. 10, 1947          2 Sheets-Sheet 1
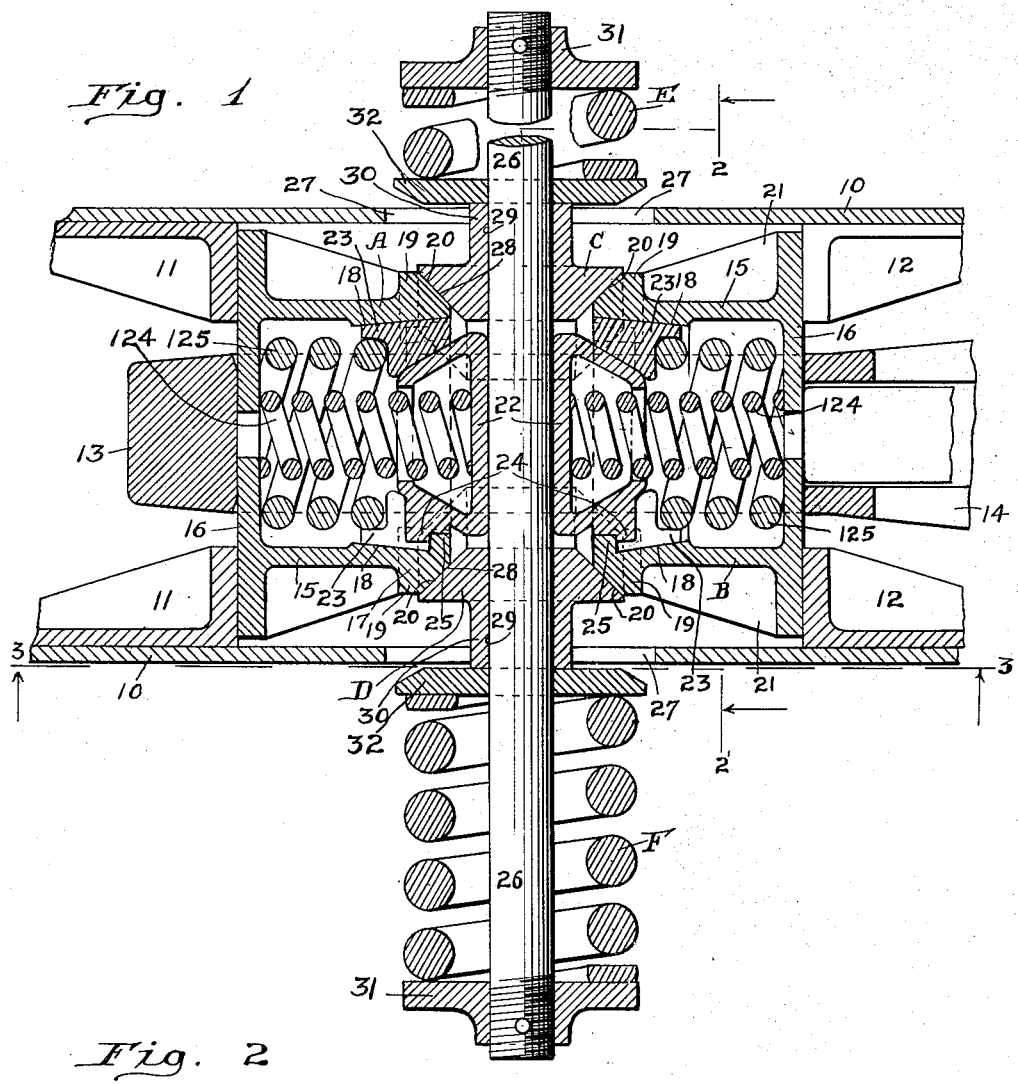
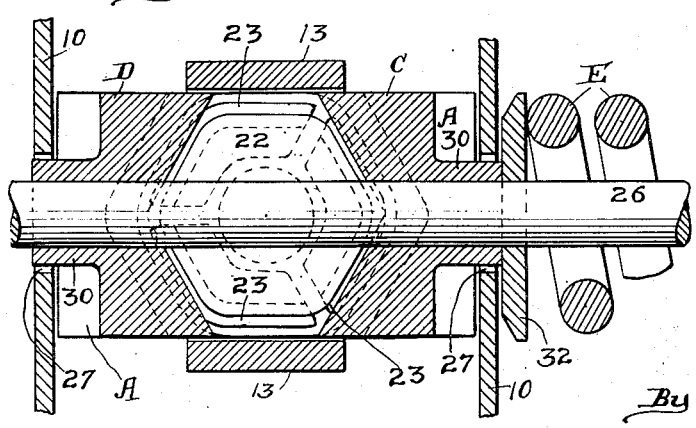
Inventor:
George E. Dath.
By Henry Fuchs.
Atty.

July 25, 1950 G. E. DATH 2,516,300
FRICTION SHOCK ABSORBING MECHANISM FOR RAILWAY CARS
Filed Oct. 10, 1947 2 Sheets-Sheet 2
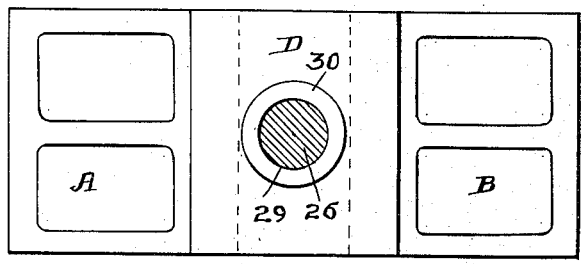
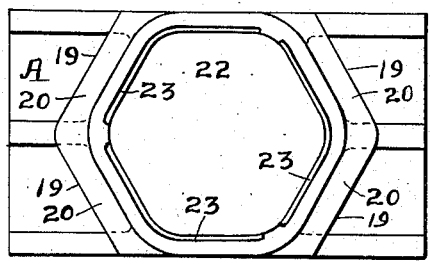
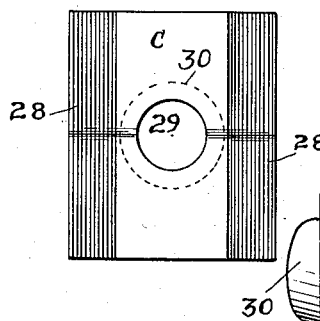
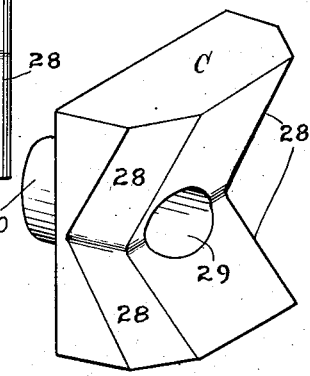
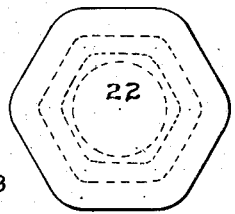
Inventor:
George E. Dath.
By Henry Fuchs
Atty.

Patented July 25, 1950

2,516,300

UNITED STATES PATENT OFFICE 2,516,300

FRICTION SHOCK ABSORBING MECHANISM FOR RAILWAY CARS

George E. Dath, Mokena, Ill., assignor to W. H. Miner, Inc., Chicago, Ill., a corporation of Delaware Application October 10, 1947, Serial No. 779,152

6 Claims. (Cl. 213—22)

This invention relates to improvements in friction shock absorbing mechanisms, especially adapted for railway draft riggings.

One object of the invention is to provide a friction shock absorbing mechanism of high capacity, comprising laterally separable wedge members, transversely arranged springs opposing separation of the wedge members, and means for spreading the wedge members apart, including inner and outer friction units relatively movable toward and away from each other lengthwise of the mechanism, wherein each friction unit includes a casing having wedging engagement with the separable wedge members, and a spring resisted friction clutch slidingly telescoped within the casing and actuated by relative movement of the friction units toward each other.

A further object of the invention is to provide a friction shock absorbing mechanism comprising laterally separable spring resisted wedge blocks and inner and outer wedge elements, relatively movable toward and away from each other lengthwise of the mechanism and having wedging engagement with the blocks for spreading the same apart, wherein the frictional resistance provided by these cooperating wedge blocks and wedge elements is augmented by additional friction means of which the relatively movable wedge elements form a part, the wedge elements being in the form of friction casings and cooperating with lengthwise movable friction means in the form of spring resisted friction clutch members slidingly telescoped within said casinglike wedge elements.

Other objects of the invention will more clearly appear from the description and claims hereinafter following.

In the accompanying drawings forming a part of this specification, Figure 1 is a horizontal, longitudinal sectional view through a portion of the underframe structure of a railway car, illustrating my improvements in connection therewith. Figure 2 is a transverse, vertical sectional view, corresponding substantially to the line 2—2 of Figure 1. Figure 3 is a longitudinal, vertical sectional view, corresponding substantially to the line 3—3 of Figure 1. Figure 4 is an elevational view of one of the combined friction shock absorbing and wedge units of the improved mechanism, the unit illustrated being that at the left hand side of Figure 1, looking from right to left. Figure 5 is an elevational view of one of the side wedges of my improved mechanism, the side wedge illustrated being that at the left hand side of Figure 2 and looking from right to left. Figure 6 is a detailed perspective view of the side wedge shown in Figure 5. Figure 7 is a rear elevational view of the wedge of the combined friction shock absorber and wedge unit shown in Figure 4.

In said drawings, 10—10 indicate the longitudinally disposed draft or center sills of a railway car, provided with the usual inner and outer sets of stop lugs 11—11 and 12—12. The inner end portion of the drawbar is indicated by 13. A yoke 14 of well-known design is attached to the drawbar and encloses my improved friction shock absorbing mechanism.

As shown in the drawings, my improved shock absorbing mechanism comprises broadly inner and outer combined friction shock absorber and wedge units A and B, side wedges C and D, and side springs E and F yieldingly opposing separation of the wedges C and D.

The combined shock absorber and wedge units A and B are of the same design, but reversely arranged, the unit A cooperating with the inner stop lugs 11—11 and the unit B with the outer stop lugs 12—12. Each unit comprises a casing 15 of hexagonal, transverse cross section, closed at its outer end by a transverse wall 16, which is extended laterally outwardly beyond the casing to provide an integral follower member. The casing 15 is open at its opposite or inner end and the walls of the same at said open end are inwardly thickened to provide a friction shell section 17. The friction shell section 17 is inwardly tapered and presents three inwardly converging friction surfaces 18—18—18 of V-shaped transverse cross section, each friction surface being formed by two adjacent walls of the hexagonal casing. At opposite sides of the open end thereof, the casing 15 is provided with laterally outwardly extending, relatively thick flanges 19—19, which are beveled off to form wedge faces 20—20 of V-shaped form, each V-shaped face 20 being formed by the flange portions of two adjacent walls of the hexagonal casing. The casing walls are preferably reenforced by longitudinally extending, exterior webs 21—21, which are integral with said walls. The webs 21—21 extend from the flanges 19 to the transverse wall 16 of the casing. A friction clutch comprising a hollow wedge block 22 and three friction shoes 23—23—23 is slidingly telescoped within the casing 15, the wedge block being of hexagonal outline and presenting three V-shaped wedge faces at the inner end engaging V-shaped wedge faces on the shoes. Each shoe 23 is of V-shaped form and presents a V-shaped friction surface on the outer side engaging with the corresponding V-shaped friction surface 18 of the casing 15. To limit outward movement of the wedge 22 with respect to the casing, the former is provided with three radially projecting lugs 24—24—24, which extend between adjacent shoes and engage in back of three inturned lugs 25—25—25 on the casing, at the open end thereof. Movement of the clutch inwardly of the casing is yieldingly resisted by inner and outer coil springs 124 and 125 arranged within the casing and engaging, respectively, the wedge 22 and the shoes 23.

The side wedges C and D are in the form of rectangular blocks mounted on a transversely disposed bolt or rod 26, which extends through openings or slots 27—27 in the draft sills 10—10. These two side wedges are interposed between the inner and outer combined friction shock absorber and wedge units A and B at opposite sides of the mechanism, each side wedge having wedge faces 28—28 of V-shaped section at opposite sides thereof engaged with the corresponding wedge faces 20—20 of the casings 15—15 of the inner and outer units A and B. The side wedges C and D are slidable laterally on the bolt 26, which extends through suitable openings 29—29 in said wedges. At the outer side thereof, each side wedge has a cylindrical collar or boss 30 surrounding the bolt 26. The collar or boss 30 of each side wedge extends through the slot 27 of the corresponding sill 10 and is accommodated therein for in and out movement.

The side springs E and F are arranged on the bolt 26 exteriorly to the sills 10—10, each spring being interposed between a nut 31 at the corresponding end of the bolt and a disclike follower 32 bearing on the outer end of the boss 30 of the corresponding side wedge C or D. The bolt 26 also acts as an abutment for the wedge blocks 22—22 of the combined friction shock absorber and wedge units A and B, the blocks 22—22 having their inner end faces bearing on the bolt at opposite sides of the same.

In applying my improved friction shock absorbing mechanism to the car, the combined friction shock absorber and wedge units A and B, together with the side wedges C and D are first assembled within the yoke. The yoke, with the parts therein, is then placed in position between the sills 10—10 and the bolt 26 inserted through the side wedges C and D. The follower discs 32—32 and the springs E and F are then placed in position on the bolt and the nuts 31—31 are applied to the ends of the bolt.

The operation of my improved friction shock absorbing mechanism is as follows: Upon compression of the mechanism in either draft or buff, one of the combined friction shock absorber and wedge units A or B is moved toward the other. During such movement of one of the units toward the other, the side wedges C and D are spread apart by sliding wedging action of the wedge faces 20—20 and 20—20 of the casings 15—15 on the wedge faces 28—28 and 28—28 of the side wedges, thereby compressing the side springs E and F. Both spring and frictional resistance is thus had due to the compression of the springs E and F and sliding of the wedge faces 20 on the wedge faces 28. At the same time, due to relative approach of the casings 15—15, the friction shoes 23—23—23 and 23—23—23 of these casings are forced inwardly against the resistance of the springs 124 and 125 and 124 and 125 of the two casings, the wedge blocks 22—22 being held against relative movement toward each other by engagement with the bolt 26. Relatively high frictional resistance provided by the friction shock absorbers of the combined units A and B is thus added to the combined friction and spring resistance afforded by the side wedges and cooperating wedge means of the units A and B.

I claim:

1. In a friction shock absorbing mechanism, the combination with laterally separable side wedges; of spring means bearing on the side wedges for yieldingly opposing lateral separation of said side wedges; abutments for said spring means; means for holding said abutments against lateral separation; front and rear casings movable lengthwise of the mechanism toward and away from each other, said casings having wedge faces at their inner ends engaging between the side wedges for forcing the same apart; a friction clutch slidingly telescoped within each casing, said clutch of each casing including a wedge block, movement of which toward the corresponding wedge block of the other end casing is opposed by the last named block; and spring means within each casing yieldingly opposing inward movement of the friction clutch.

2. In a friction shock absorbing mechanism, the combination with laterally separable side wedges; of spring means bearing on said side wedges to yieldingly opposing lateral separation of said side wedges; spring abutments for said spring means at opposite sides of the mechanism; means for holding said abutments against lateral separation; front and rear casings movable toward and away from each other lengthwise of the mechanism, each of said casings having wedge faces at opposite sides engaged between said side wedges to force the latter apart; friction shoes slidingly telescoped within each casing; spring means yieldingly opposing inward movement of the shoes; and front and rear wedge blocks, each held against movement toward other lengthwise of the mechanism by said last named block, said blocks having wedging engagement with the shoes of said end casings respectively.

3. In a friction shock absorbing mechanism, the combination with laterally separable side wedges; of a transverse bar guiding said side wedges for movement toward and away from each other; springs at opposite sides of the mechanism bearing on said side wedges for yieldingly opposing lateral separation of said side wedges; fixed abutment means for said springs on opposite ends of said bar; front and rear casings movable lengthwise of the mechanism toward and away from each other, said casings having wedge means thereon engageable between said side wedges for spreading the same apart; friction shoes slidingly telescoped within each end casing; wedge blocks bearing on said bar at opposite sides thereof and having wedging engagement with the shoes; and spring means within said casings yieldingly opposing movement of the shoes inwardly of said casings.

4. In a friction shock absorbing mechanism, the combination with a transverse guide bar; of fixed spring abutments at opposite ends of said bars; laterally separable side wedges guided on said bar; springs on said bar at opposite ends thereof interposed between said side wedges and abutments for yieldingly opposing lateral separation of said side wedges; casings at opposite ends of the mechanism movable toward and away from each other lengthwise of the mechanism; wedge faces on said casings at opposite sides of the inner ends of said casings engaged between said laterally separable side wedges to spread the same apart; friction shoes slidingly telescoped within said end casings; blocks bearing on said bar and having wedging engagement with the shoes of said end casings respectively; and springs within each end casing yieldingly opposing movement of the corresponding wedge and shoes inwardly of said casing.

5. In a friction shock absorbing mechanism, the combination with combined end followers and casings relatively movable toward each other, said casings having lengthwise extending interior friction surfaces; of friction shoes slidingly telescoped within the casing portions of said combined followers and casings and having lengthwise sliding engagement with the friction surfaces thereof; wedge members engaging said shoes; a spring within the casing yieldingly opposing inward movement of the shoes; a transverse bar between said wedges which said wedges abut; spring abutments at opposite ends of said bar fixed to the latter; laterally slidable side wedges on said bar, said casing portions extending between said side wedges in wedging engagement therewith; and side springs at opposite sides of the mechanism reacting between said side wedges and spring abutments for yieldingly resisting separation of said side wedges.

6. In a friction shock absorbing mechanism, the combination with laterally separable side wedges; of spring means bearing on the outer sides of said side wedges and yieldingly opposing lateral separation of said side wedges; abutment means for said springs at opposite sides of the mechanism; means for holding said abutment means against lateral separation; front and rear casings movable lengthwise of the mechanism toward and away from each other, said casings having outer wedge faces at their inner ends engaging between said side wedges for forcing the same apart as said casings are moved lengthwise toward each other, said casings having lengthwise extending interior friction surfaces; a friction clutch slidingly telescoped within each casing, said clutch of each casing including friction shoes slidable lengthwise on the friction surfaces of the casing, and a wedge block held against movement toward the wedge block of the clutch of the other casing by said last named wedge block; and spring means within the casing yieldingly opposing inward movement of the friction clutch.

GEORGE E. DATH.

REFERENCES CITED

The following references are of record in the file of this patent:

UNITED STATES PATENTS

| Number | Name | Date |
|---|---|---|
| 1,093,392 | Frame | Apr. 14, 1914 |
| 1,972,957 | Sproul | Sept. 11, 1934 |